(12) United States Patent
Colyer et al.

(10) Patent No.: US 9,189,257 B2
(45) Date of Patent: Nov. 17, 2015

(54) COMPUTER DEVICE AND METHOD OF PROVIDING CONFIGURATION FILES IN A COMPUTER DEVICE

(71) Applicant: Pivotal Software, Inc., Palo Alto, CA (US)

(72) Inventors: Adrian Colyer, Southhampton (GB); Joseph Benjamin Hale, Southampton (GB); Andrew Wilkinson, Southampton (GB)

(73) Assignee: Pivotal Software, Inc., Palo Alto, CA (US)

( * ) Notice: Subject to any disclaimer, the term of this patent is extended or adjusted under 35 U.S.C. 154(b) by 379 days.

(21) Appl. No.: 13/671,256

(22) Filed: Nov. 7, 2012

(65) Prior Publication Data

US 2013/0117424 A1    May 9, 2013

Related U.S. Application Data

(60) Provisional application No. 61/556,923, filed on Nov. 8, 2011.

(51) Int. Cl.
*G06F 9/445* (2006.01)
*G06Q 10/00* (2012.01)
*H04L 1/00* (2006.01)

(52) U.S. Cl.
CPC ............ *G06F 9/44505* (2013.01); *G06Q 10/00* (2013.01); *G06Q 2220/00* (2013.01); *H04L 1/00* (2013.01); *H04L 2201/00* (2013.01)

(58) Field of Classification Search
None
See application file for complete search history.

(56) References Cited

U.S. PATENT DOCUMENTS

| | | | | |
|---|---|---|---|---|
| 6,871,221 | B1 * | 3/2005 | Styles | 709/221 |
| 2002/0059348 | A1 * | 5/2002 | Lee et al. | 707/516 |
| 2002/0178239 | A1 * | 11/2002 | Kinyon et al. | 709/220 |
| 2003/0140333 | A1 * | 7/2003 | Odaka et al. | 717/115 |
| 2005/0091348 | A1 * | 4/2005 | Ferri et al. | 709/220 |
| 2010/0042639 | A1 * | 2/2010 | Grinshpun et al. | 707/101 |
| 2010/0138825 | A1 * | 6/2010 | Harrop | 717/174 |

OTHER PUBLICATIONS

Vincent Santaguida, "Folder and File Naming Convention—10 Rules for Best Practice", MultiCIM Technologies, Jan. 2010.*

* cited by examiner

*Primary Examiner* — Oleg Survillo
*Assistant Examiner* — Jihad Boustany
(74) *Attorney, Agent, or Firm* — Fish & Richardson P.C.

(57) ABSTRACT

A computer device (200) includes a deployment unit (220) which deploys an application program (100) into a runtime execution environment (203) based on configuration information from a plurality of configuration files (120), including at least one base configuration file (122) and one or more supplementary configuration files (123), wherein a merge unit (220) uses the one or more supplementary configuration files (123) to act upon and modify the configuration information provided in the base configuration file (122). A method of providing configuration files in a computer device (200) includes modifying configuration information provided in the base configuration file (122) using the one or more supplementary configuration files (123) to provide a merged configuration file (124), and deploying the application program (100) into the runtime execution environment (203) based on configuration information from the merged configuration file (124).

22 Claims, 5 Drawing Sheets

COMPUTER DEVICE AND METHOD OF PROVIDING CONFIGURATION FILES IN A COMPUTER DEVICE

CROSS REFERENCE TO RELATED APPLICATIONS

This application claims the benefit of U.S. Provisional Patent Application 61/556,923 filed on Nov. 8, 2011 and entitled "Computer Device and Method of Providing Configuration Files in a Computer Device," which is hereby incorporated by reference.

BACKGROUND

As one example, US2010/138825A1 by Harrop (assigned to VMware, Inc.) describes a mechanism for providing configuration files using configuration templates.

In general terms, a configuration file contains configuration information which defines how an application program will interact with various resources provided by a computer device, and defines how the runtime execution environment of this computer device needs to be adapted in order to support the application. Traditionally, the configuration file would be written in a text-based format such as ASCII. More recently, the configuration information is written in a markup language such as XML. The configuration information may be structured to follow a predetermined schema. It is desired that the configuration files should be robust and suitable even for open-ended runtime execution environments that bring together resources from many different sources and vendors. The complex nature of modern computer devices means that a large volume of configuration information is often required. The configuration information may be distributed among many different parts of the application and may be supplied in several different formats, even within the same application.

There is a desire to make operation of the computer device more efficient, in particular by reducing the workload required to deploy an application program into a runtime execution environment. Therefore, it is known to provide templates containing frequently-needed configuration information. These templates may exist in multiple versions, and from multiple sources.

When an application is deployed, two or more configuration files may be encountered having the same file name. Thus, a file name conflict may occur in relation to the intended runtime instance of the application program. In this situation, the deployment process may display a warning to the user and require manual intervention to resolve the file conflict. Usually, the user may choose only one of the configuration files in preference to any of the others. As a result, configuration information in the other, not-chosen, configuration files is typically ignored or lost.

The example embodiments have been provided with a view to addressing at least some of the difficulties that are encountered in current computer devices, whether those difficulties have been specifically mentioned above or will otherwise be appreciated by the person of ordinary skill in the art from the discussion herein. At least in some of the following example embodiments, it is desired to provide an improved mechanism for providing configuration files of an application program in a computer device.

SUMMARY OF THE INVENTION

According to the present invention there is provided a computer device, a method and a computer-readable storage medium as set forth in the appended claims. Other, optional, features of the invention will be apparent from the dependent claims, and the description which follows.

At least some of the following example embodiments provide an improved mechanism for providing configuration files in a computer device. There now follows a summary of various aspects and advantages according to embodiments of the invention. This summary is provided as an introduction to assist those skilled in the art to more rapidly assimilate the detailed discussion herein and does not and is not intended in any way to limit the scope of the claims that are appended hereto.

In one aspect, a computer device comprises a deployment unit which deploys an application program into a runtime execution environment based on configuration information from a plurality of configuration files. The configuration files include at least one base configuration file and one or more supplementary configuration files. A merge unit uses the one or more supplementary configuration files to modify configuration information provided in the base configuration file.

In one aspect, a method of providing configuration files in a computer device includes modifying configuration information provided in a base configuration file using one or more supplementary configuration files to provide a merged configuration file, and deploying an application program into a runtime execution environment based on configuration information from the merged configuration file.

In one aspect, a tangible non-transient computer-readable storage medium is provided having recorded thereon instructions which, when implemented by a computer device, cause the computer device to be arranged as set forth herein and/or which cause the computer device to perform the method as set forth herein.

BRIEF DESCRIPTION OF THE DRAWINGS

For a better understanding of the invention, and to show how example embodiments may be carried into effect, reference will now be made to the accompanying drawings in which.

DETAILED DESCRIPTION

The following example embodiments will be discussed in detail in relation to an execution environment which includes a Java Virtual Machine (JVM) and a web application server such as Apache Tomcat or VMware vFabric™ tc Server™. However, the teachings, principles and techniques herein are also applicable in other example embodiments, such as other virtual machine environments and other application platforms.

Figure 1:
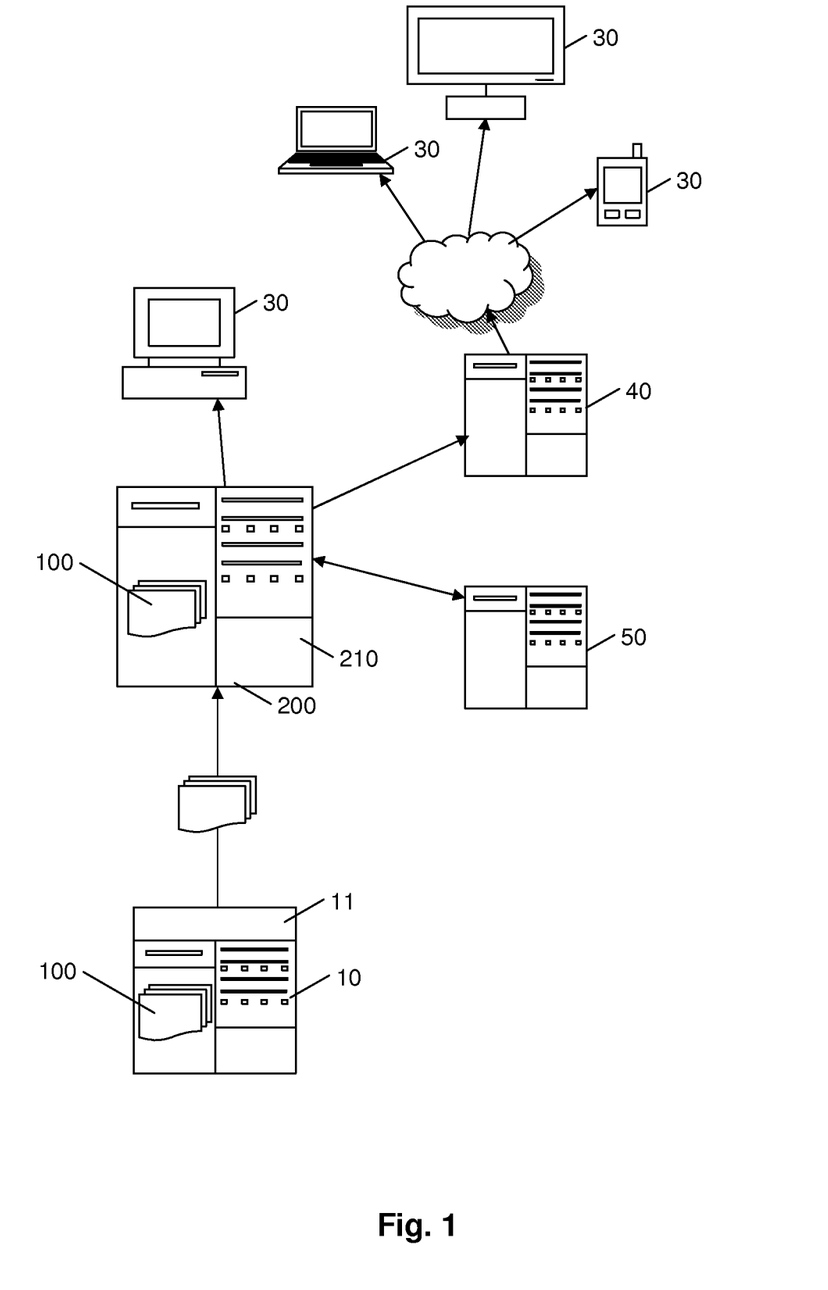
FIG. 1 is a schematic overview of an example computer network in which the example embodiments may be used.

FIG. 1 is a schematic overview of an example computer network in which the example embodiments discussed herein are applied. An application program 100 is developed on a development system 10 and is tested by a variety of testing tools 11. The finished application 100 is then deployed onto one or more host computer devices 200, using a deployment unit 210. In one example embodiment, the deployment unit 210 is implemented by the VMware vFabric suite and in particular may be provided by the vFabric tc Server, as an enterprise application server for Java. However, the techniques described herein are also applicable in other platforms, such as the Apache Tomcat server. The application 100 runs (executes) on the host computer device 200 and, in this example, serves one or more individual end-user client devices 30 either over a local network or via intermediaries such as in intermediary server 40. When running the application 100, the host computer device 200 may communicate with various other computers, such as a set of database servers 50. FIG. 1 is only an illustrative example and many other specific network configurations will be apparent to those skilled in the art.

The application program 100 may be provided using object-oriented programming languages, such as the popular Java language. Java relies upon a virtual machine which converts universal Java bytecode into binary instructions in the instruction set of the host computer device 200. More recently, Java 2 Standard Edition (J2SE) and Java 2 Enterprise Edition (JEE or J2EE) have been developed to support a very broad range of applications from the smallest portable applets through to large-scale multilayer server applications such as complex controls for processes, manufacturing, production, logistics, and other industrial and commercial applications.

Figure 2:
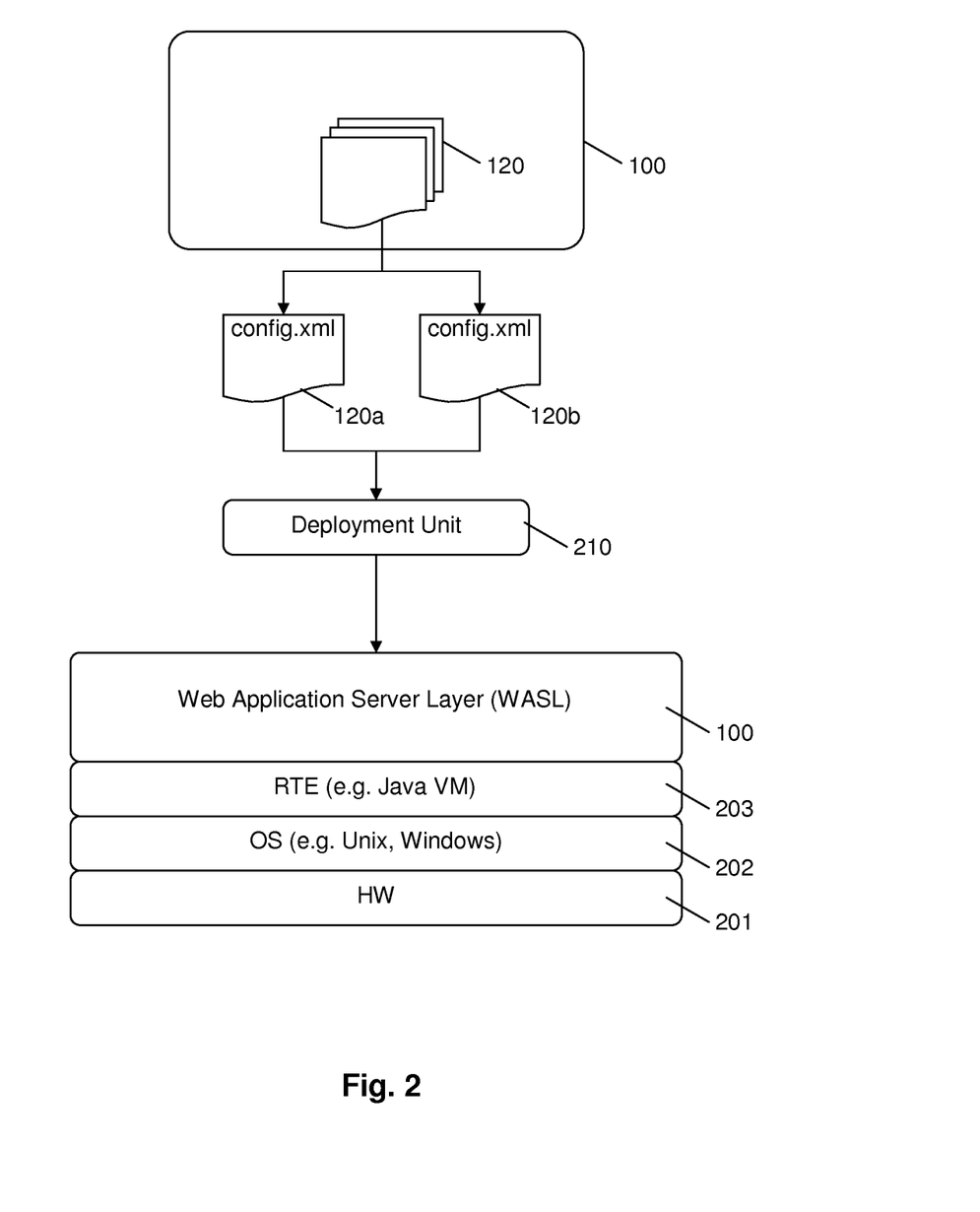
FIG. 2 is a schematic overview of a computer device according to an example embodiment.

FIG. 2 is a schematic overview of an example computer device 200. In this example, the host computer device 200 includes physical hardware (HW) 201 such as memory, processors, I/O interfaces, backbone, power supply and so on as are found in, for example, a typical server computer; an operating system (OS) 202 such as Windows, Linux or Solaris; and a runtime environment (RTE) 203 such as Microsoft .NET or Java (e.g. Hotspot or Java 1.5). The runtime environment 203 supports a multitude of components, modules and units that coordinate to perform the actions and operations that are required of the computer device 200 to support execution of the application program 100.

In the example embodiment, the application program 100 is a web server application layer which supports web applications to provide services to clients, locally or remotely, across a network, as shown in FIG. 1. In one example, the server application 100 is a web application server layer, such as Apache Tomcat or VMware vFabric tc Server, which acts as a comprehensive service layer for web applications. A client device 30 may access the web applications via an Internet browser.

As shown in FIG. 2, the application program 100 includes a plurality of configuration files 120. These configuration files 120 are read and processed by the deployment unit 210 when the application program 100 is deployed into the runtime environment 203.

As one example, each of the configuration files 120 is written in a markup language, such as XML, and may be formatted according to a predetermined schema. The complex nature of modern computer devices means that a large amount of configuration information may be required. Also, the configuration information may be highly complex.

A file conflict may occur where two configuration files 120 having the same file name are encountered in relation to a runtime instance of the application program 100. As an example, FIG. 2 shows two configuration files 120a and 120b, which are both named "config.xml". In this situation, the deployment unit 210 may display a warning to the user and require manual intervention to resolve the file conflict. Usually, the user may choose only one of the configuration files 120 in preference to any others. For example, the user may instruct the deployment unit 210 to overwrite the first file 120a with the second file 120b. In this case, the configuration information is only provided from the second file 120b, and the configuration in the first file 120a is lost. The example embodiments provide a mechanism within the deployment unit 210 to preserve the configuration information from both of these configuration files 120a, 120b. Further, the example embodiments allow the collision between these configuration files 120a, 120b to be resolved in the deployment unit 210 without additional user intervention.

Figure 3:
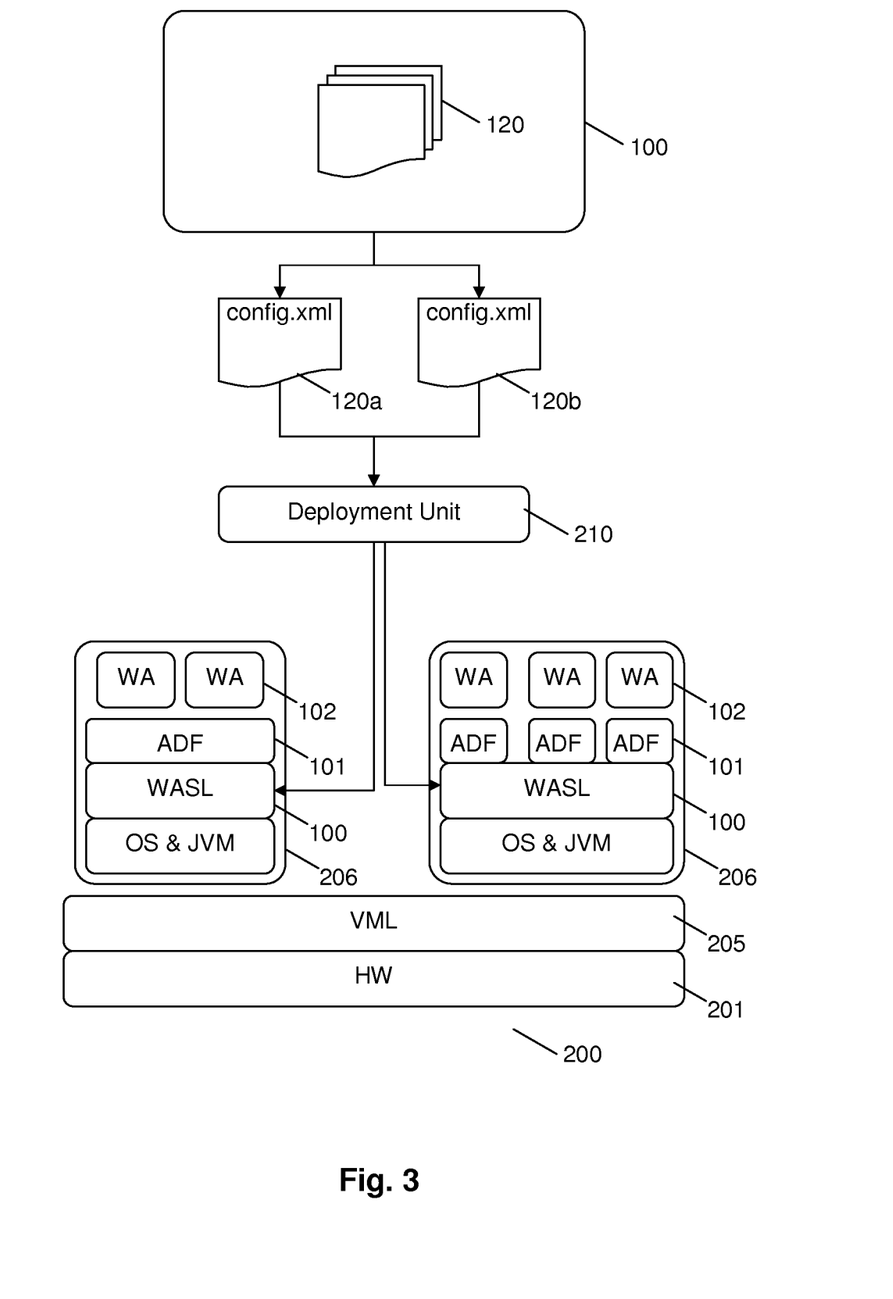
FIG. 3 is a schematic diagram showing various components within the example computer device in more detail.

FIG. 3 shows a further example implementation of the computer device 200. In this example, the hardware 201 supports a virtual machine layer (VML) 205 which provides a plurality of virtual machine abstractions 206, each of which includes a separate guest operating system (OS) and runtime execution environment (JVM). The virtual machine layer 205 may be implemented by VMware ESX. In this example, the deployment unit 210 may deploy multiple runtime instances of the same application program 100, such as the web application server layer (WASL), into the virtual machines 206. The configuration files 120 are used multiple times, for each of the multiple runtime instances. Further, different configuration information may be required for each runtime instance, depending upon the nature of that particular instance and the specific runtime environment into which the application program 100 is deployed each time.

As also shown in FIG. 3, each of the virtual machines 206 may further include instances of an application development framework (ADF) 101, such as Spring, as middleware which supports integration with the web application server layer (WASL) of the application program 100, such as tc Server or Apache Tomcat. Also, a plurality of web applications (WA) 102 may be provided, which may serve their remote clients over the Internet. These examples have been simplified for ease of explanation, but it will be appreciated that the application program 100 being deployed may take many specific different forms and may interrelate with many other components within the computer system.

Typically, the configuration information is tailored specifically to the requirements of the application 100 and is bespoke for each application. The configuration information is often written laboriously by hand or is cut-and-pasted from previous applications and then carefully modified for this new application. Both methods are expensive and time-consuming. As a result, many difficulties arise when creating the configuration information. For example, it takes a lot of time and effort to produce the configuration information and this effort is often duplicated many times when creating new applications. Also, it is difficult for a large team of programmers to coordinate their efforts and produce coherent and accurate configuration information that applies correctly and consistently across many different parts of the application 100. Further, it is difficult to later change the configuration information, such as when the application 100 evolves and is deployed to alternate or improved versions of the runtime environment 203.

Figure 4:
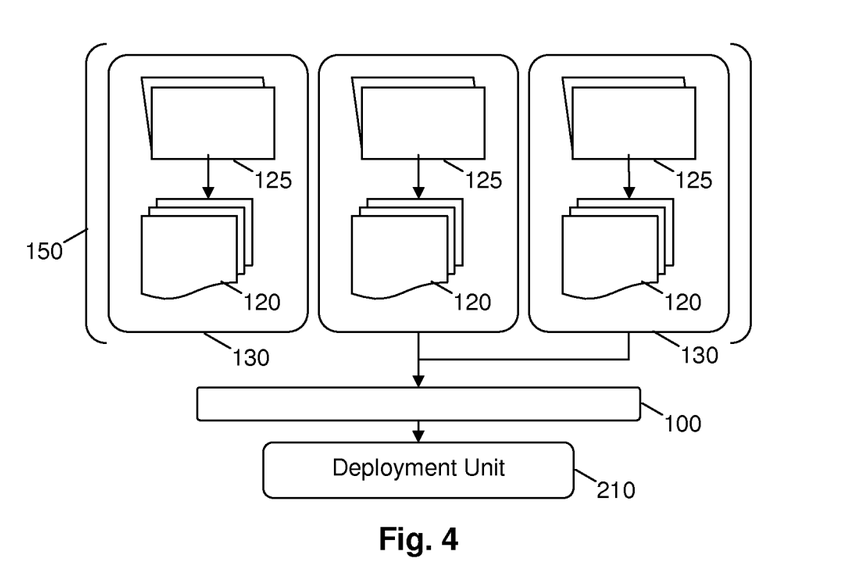
FIG. 4 is a schematic diagram showing configuration files in the example computer device.

FIG. 4 shows the example computer device 200 in more detail. As shown in FIG. 4, one or more templates 130 may be provided. The templates 130 are particularly useful when developing and preparing the application program 100. Each template 130 may include configuration files 120 containing frequently-needed configuration information. Suitably, each template 130 provides configuration information to support a commonly-used resource, such as a feature or application on a runtime instance of the application program 100. For example, the templates 130 may configure features such as SSL (secure sockets layer) or JMX (Java management extensions) or add a management application to an instance at creation time, such as Spring Insight. These templates 130 may exist in multiple versions, and may be provided from multiple sources. Thus, separate templates 130 may include configuration files 120 having the same file name, and the use of templates 130 may increase the potential for a file name conflict.

In one aspect, the configuration files 120 are arranged in a plurality of directories 125. In one example, each template 130 may be provided as a directory 125 containing one or more configuration files 120. A library 150 may be provided comprising a plurality of the templates 130. The developer or user may then select a group of one or more templates 130 from the library 150, relevant to the resources of interest. Further, it may be desired to employ the same template 130 multiple times in relation to the same runtime instance of the application program 100. For example, one of the templates 130 may be provided with configuration information for a connector such as a http: protocol connector, and the same template may also be used, with minor modifications, for a https: secure connector. Repeated use of the same template 130 again raises the issue of a file name conflict.

Figure 5:
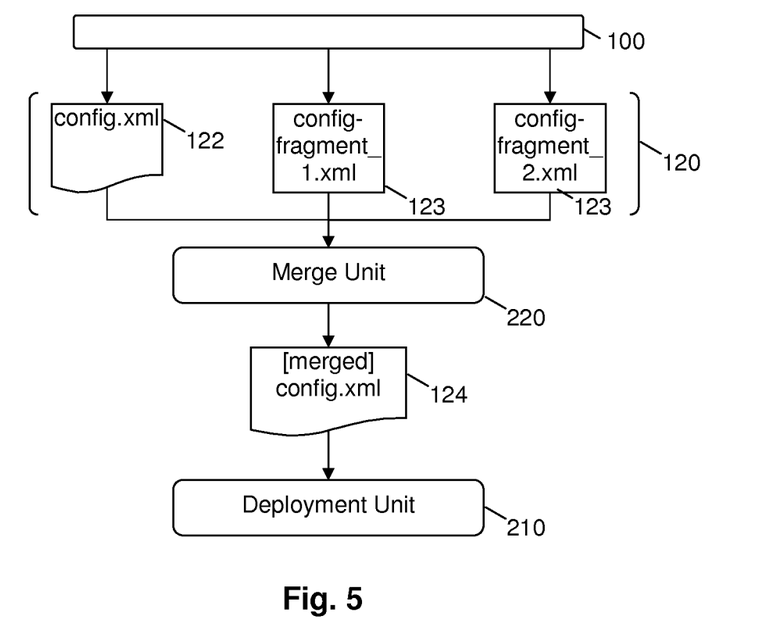
FIG. 5 is a schematic diagram showing configuration files in the example computer device in more detail.

FIG. 5 shows the example computer device 200 in more detail, wherein the deployment unit 210 further comprises a merge unit 220. As discussed above, the application 100 and its associated configuration files 120 are initially stored in a suitable storage unit within, or otherwise accessible to, the hardware 201. A processor executes, or will execute, code to provide the runtime execution environment 203. As shown in FIG. 5, the deployment unit 210 is arranged to deploy the application program 100 into the runtime environment 203 with reference to the configuration files 120. The deployment unit 210 is arranged to process the configuration information upon creating a new runtime instance of the application program 100, in order to correctly configure the application.

In the example embodiment shown in FIG. 5, the plurality of configuration files 120 include at least one base configuration file 122 and one or more supplementary configuration files 123. The merge unit 220 uses the supplementary configuration files 123 to act upon and modify the configuration information provided in the base configuration files 122, thereby providing a combined or modified configuration file 124. Here, the combined configuration file 124 includes configuration information derived from both the base configuration file 122 and from at least one of the supplementary configuration files 123.

As one example, the base configuration files 120 include one or more of the files:

```
conf/server.xml,
conf/web.xml,
conf/context.xml, and/or
conf/tomcat-users.xml
```

In which case, the respective supplementary configuration files 123 are provided as:

```
conf/server-fragment.xml,
conf/web-fragment.xml,
conf/context-fragment.xml, and/or
conf/tomcat-users-fragment.xml
```

In this example, the supplementary configuration files 123 conveniently have a file name with a first portion carrying the same name as their respective base configuration file 122, together with a modifier or identifier portion, such as "-fragment". This naming convention allows ready identification of the supplementary configuration files 123, and clearly establishes an association of the supplementary configuration files 123 with their respective base configuration file 120. The supplementary files 123 contribute to and modify the configuration information in the base configuration file 122 of the same name.

In one aspect, each of the supplementary configuration files 123 contains a markup language fragment (e.g. XML fragment) that describes configuration information that is to be modified (e.g. added, removed, or updated) in the respective base configuration file 122. The fragment describes its contributions using keywords, or tags. The keywords are readily identified and parsed, e.g. by the merge unit 220.

The fragment further comprises a location element which identifies a location within the configuration information which is to be modified. In the example embodiment, XML elements are defined to describe a single XML element that the contributions should act upon. The XML elements that exist can be thought of as a direct example of an XPath expression. For example, the XPath expression //Server/Service[@name="Catalina"] may be represented as follows.

```
<?xml version='1.0' encoding='utf-8'?>
<Server>
    <Service name="Catalina">
    </Service>
</Server>
```

A more complex example of the XPath expression //Server/Service[@name="Catalina"]/Engine[@name="Catalina" and @defaultHost="localhost"] is represented as follows.

```
<?xml version='1.0' encoding='utf-8'?>
<Server>
    <Service name="Catalina">
        <Engine name="Catalina" defaultHost="localhost">
        </Engine>
    </Service>
</Server>
```

Once an element has been specified using the location information, the relevant add, update and/or delete contributions can then be specified. In the example embodiments, an "update:" keyword is used only on attributes, while the "add:" and "remove:" keywords may be used on both elements and attributes. In the following example, these contributions are updates and additions of attributes:

```
<?xml version='1.0' encoding='utf-8'?>
<Server>
    <Listener className="com.springsource.tcserver.serviceability.rmi.JmxSocketListener"
        update:useSSL="true"
        add:useJdkClientFactory="true"
```

-continued

```
            passwordFile="${catalina.base}/conf/jmxremote.password"
            accessFile="${catalina.base}/conf/jmxremote.access"
            add:keystoreFile="${catalina.base}/conf/tcserver.keystore"
            add:keystorePass="changeme"
            add:truststoreFile="${catalina.base}/conf/tcserver.keystore"
            add:truststorePass="changeme"
            update:authenticate="false"/>
</Server>
```

Conveniently, when adding an element, once the element has been marked with the "add:" keyword, it is unnecessary to also mark the attributes of the new element. An example of adding an element without marking its attributes follows.

```
<?xml version='1.0' encoding='utf-8'?>
<Server>
    <Service name="Catalina">
        add:Connector executor="tomcatThreadPool"
            port="${http.port:8080}"
            protocol="org.apache.coyote.http11.Http11Protocol"
            connectionTimeout="20000"
            redirectPort="${https.port:8443}"
            acceptCount="100"
            maxKeepAliveRequests="15"/>
    </Service>
</Server>
```

In the example embodiments, it is unnecessary to mark any sub-elements with the keyword "add:" when the parent element is marked. An example adding an element with sub-elements without marking its sub-elements follows.

In the example embodiments, as shown in FIG. 5, the base configuration file 122 may be modified iteratively by several supplementary configuration files 123 in succession. Conveniently, the contributions defined by a first of the supplementary configuration files 123 (e.g. "config-fragment_1.xml") are applied to modify the configuration information of the base configuration file 122 ("config.xml") and the resulting modified configuration file 124 (also called "config.xml") is output and stored. Then, a second of the supplementary configuration files 123 is applied and the contributions in that file further modify the configuration information as appropriate. The process may continue until no further supplementary configuration files 123 are available, and a final modified configuration file 124 is output ready to be used by the deployment unit 210 for deployment of the application 100 into the runtime environment 203. This iterative process allows the contributions to be created and defined in separate supplementary configuration files 123, but then applied in combination. In one aspect, the order in which the supplementary configuration files 123 may be defined in advance.

```
<?xml version='1.0' encoding='utf-8'?>
<Server>
    <Service name="Catalina">
        <Engine name="Catalina" defaultHost="localhost" add:jvmRoute="${node.name:tc-runtime-1}">
            <add:Cluster className="org.apache.catalina.ha.tcp.SimpleTcpCluster" channelSendOptions="8">
                <Manager className="org.apache.catalina.ha.session.DeltaManager"
                    expireSessionsOnShutdown="false"
                    notifyListenersOnReplication="true"/>
                <Channel className="org.apache.catalina.tribes.group.GroupChannel">
                    <Membership className="org.apache.catalina.tribes.membership.McastService"
                        address="228.0.0.4"
                        port="45564"
                        frequency="500"
                        dropTime="3000"/>
                    <Receiver className="org.apache.catalina.tribes.transport.nio.NioReceiver"
                        address="auto"
                        port="4000"
                        autoBind="100"
                        selectorTimeout="5000"
                        maxThreads="6"/>
                    <Sender className="org.apache.catalina.tribes.transport.ReplicationTransmitter">
                        <Transport className="org.apache.catalina.tribes.transport.nio.PooledParallelSender"/>
                    </Sender>
                    <Interceptor className="org.apache.catalina.tribes.group.interceptors.TcpFailureDetector"/>
                    <Interceptor className="org.apache.catalina.tribes.group.interceptors.MessageDispatch15Interceptor"/>
                </Channel>
                <Valve className="org.apache.catalina.ha.tcp.ReplicationValve" filter=""/>
                <Valve className="org.apache.catalina.ha.session.JvmRouteBinderValve"/>
                <ClusterListener className="org.apache.catalina.ha.session.JvmRouteSessionIDBinderListener"/>
                <ClusterListener className="org.apache.catalina.ha.session.ClusterSessionListener"/>
            </add:Cluster>
        </Engine>
    </Service>
</Server>
```

The library 150 shown in FIG. 4 may contain, for example, of the order of seven or eight different templates. A user or developer will typically select of the order of three or four of these templates 130 to be applied to the application program 100. The order in which the supplementary configuration files 123 are to be applied may be explicitly recorded at this stage, or may be implicit base, e.g., on the order in which the supplementary configuration files 123 are selected.

In one example, the base configuration file 122 may be provided initially without any configuration information contained therein, and the one or more supplementary configuration files 123 may add configuration information into the base configuration file 122 and may then further update, or remove, that configuration information as appropriate. Thus, the supplementary configuration files 123 make contributions to the configuration information and are combined into the base configuration file 122. The application program 100 may be supplied to the host computer 200 only with a set of one or more of the supplementary configuration files 123. In which case, the merge unit 220 may begin by creating the respective base configuration file 122, which may initially be an empty file, and then use the supplied supplementary configuration files 123 to modify the configuration information as contained in the base configuration file 122.

As an example, a supplementary configuration file 123 named "server-fragment.xml" is supplied as follows:

```
<?xml version='1.0' encoding='utf-8'?>
<add:Server port="${shutdown.port:-1}" shutdown="SHUTDOWN">
...
</add:Server>
```

In this example, the root <Server> element is annotated with the "add:" keyword, indicating that the fragment expects to add a new root element to the respective base configuration file, here called "server.xml". An XML document can only have a single root element, which brings the ordering requirement that this particular supplementary configuration file 123 should be applied first. Other supplementary configuration file 123 may then modify the root element or append further elements to the now-defined root element.

Figure 6:
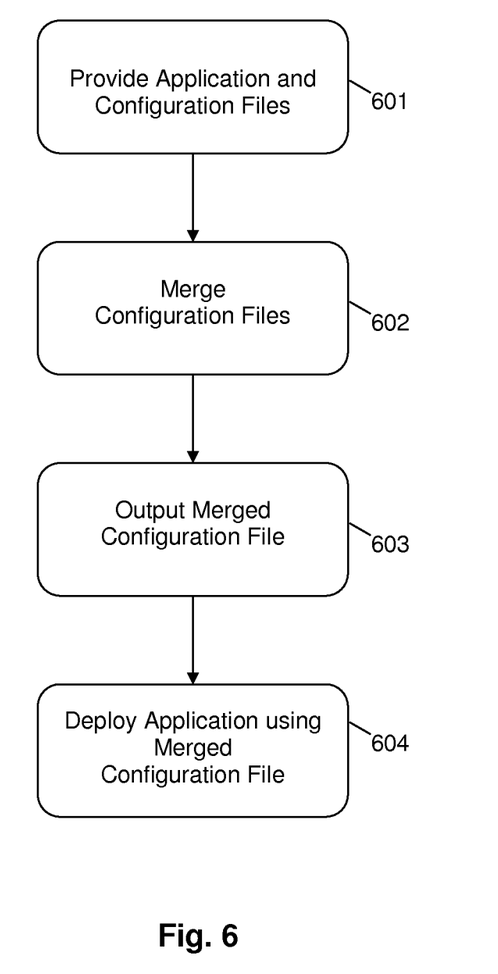
FIG. 6 is a schematic flow diagram of an example method of providing configuration files in a computer device.

FIG. 6 is a schematic flow diagram of an example method of providing configuration files. Step 601 includes providing the application program 100 having a plurality of configuration files 120 associated therewith, including at least one base configuration file 122 and one or more of the supplementary configuration files 123. As noted above, the base configuration file 122 may be created if it is not already present. Step 602 comprises modifying the configuration information provided in the base configuration file 122 using the one or more supplementary configuration files 123. The step 602 may include iteratively modifying the configuration information in the base configuration file 122 by a plurality of the supplementary configuration files 123 in succession, including creating intermediate modified configuration files as appropriate. Suitably, a merged configuration file 124 is output at step 603. Step 604 comprises deploying the application program 100 into the runtime execution environment 203 based on the configuration information from the merged configuration file 124.

As described herein, file name conflicts between configuration files can be reduced, or avoided, by defining a base configuration file and applying contributions and modifications as defined in one or more supplementary configuration files. These configuration files may be merged together automatically. There may be minimal user intervention at the point in time when the configuration files are merged. The described mechanism is powerful and flexible, and can be adapted to a wide range of specific needs. Adopting supplementary configuration files in the same markup language as the base configuration files is simple and convenient. The contributions made by the supplementary configuration files are defined with minimal additional overhead or additional metadata.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the example embodiments have been described with reference to the components, modules and units discussed herein, such functional elements may be combined into fewer elements or separated into additional elements.

In summary, the example embodiments have described an improved mechanism for providing configuration files within a computer device The industrial application of the example embodiments will be clear from the discussion herein.

Although a few example embodiments have been shown and described, it will be appreciated by those skilled in the art that various changes and modifications might be made without departing from the scope of the invention, as defined in the appended claims.

The invention claimed is:

1. A method comprising:
receiving, by a deployment unit of a computing system, a user selection of a base configuration template storing a base configuration file and a plurality of supplementary configuration templates each storing a respective supplementary configuration file, each supplementary configuration file including a respective tagged element for modifying a corresponding tagged element of the base configuration file, each configuration file storing information on deploying an application program into a runtime execution environment;
obtaining an order of applying the supplemental configuration files to the base configuration file, the order indicating that a first supplemental configuration file is to be applied to the base configuration file before a second supplemental configuration file is applied to the base configuration file;
merging the base configuration file and the supplemental configuration files by a merge unit of the deployment unit in a plurality of iterations, comprising, in a first iteration, modifying configuration information provided in the base configuration file using the first supplemental configuration file and storing the modified configuration information as a new base configuration file, and then, in a second iteration, modifying configuration information stored in the new base configuration file using the second configuration file; and deploying the application program into the runtime execution environment based on configuration information resulted from the merging.

2. The method of claim 1, wherein the new base configuration file has a file name that is same as a file name of the original base configuration file.

3. The method of claim 2, wherein each configuration file is in an extensible markup language (XML) format.

4. The method of claim 1, wherein the plurality of configuration files include a plurality of the base configuration files and each of the supplementary configuration files contributes to and modifies the configuration information in a respective one of the plurality of base configuration files.

5. The method of claim 1, wherein the supplementary configuration files each have a file name comprising a first name portion carrying the same name as the base configuration file, and a second name portion indicating that the file is a supplementary configuration file.

6. The method of claim 1, wherein each of the supplementary configuration files, in a respective tagged element, contains at least one markup language fragment that identifies the configuration information that is to be modified in the respective base configuration file.

7. The method of claim 6, wherein the markup language fragment includes tags which identify the tagged element within the configuration information that is to be modified in the respective base configuration file.

8. The method of claim 1, wherein each of the supplementary configuration files comprises markup language fragments that identify the configuration information to be modified in the base configuration file using a plurality of predetermined keywords to represent at least add, update and remove contributions to the configuration information in the respective base configuration file.

9. The method of claim 8, wherein an "update:" keyword is used on attributes within the configuration information, and an "add:" keyword and a "remove:" keyword are used on both elements and attributes within the configuration information.

10. A computer system, comprising:
one or more processors;
a non-transitory computer-readable medium storing instructions configured to cause the one or more processors to perform operations comprising:
receiving a user selection of a base configuration template storing a base configuration file and a plurality of supplementary configuration templates each storing a respective supplementary configuration file, each supplementary configuration file including a respective tagged element for modifying a corresponding tagged element of the base configuration file, each configuration file storing information on deploying an application program into a runtime execution environment;
obtaining an order of applying the supplemental configuration files to the base configuration file, the order indicating that a first supplemental configuration file is to be applied to the base configuration file before a second supplemental configuration file is applied to the base configuration file;
merging the base configuration file and the supplemental configuration files in a plurality of iterations, comprising, in a first iteration, modifying configuration information provided in the base configuration file using the first supplemental configuration file and storing the modified configuration information as a new base configuration file, and then, in a second iteration, modifying configuration information stored in the new base configuration file using the second configuration file; and
deploying the application program into the runtime execution environment based on modified configuration information resulted from the merging.

11. The computer system of claim 10, wherein deploying the application program into the runtime execution environment is based on the configuration information in the modified configuration file modified using the second configuration file.

12. The computer system of claim 10, wherein the plurality of configuration files include a plurality of the base configuration files and each of the supplementary configuration files contributes to and modifies the configuration information in a respective one of the plurality of base configuration files.

13. The computer system of claim 10, wherein the supplementary configuration files each have a file name comprising a first name portion carrying the same name as the base configuration file, and a second name portion indicating that the file is a supplementary configuration file.

14. The computer system of claim 10, wherein each of the supplementary configuration files contains, in a respective tagged element, at least one markup language fragment that identifies configuration information that is to be modified in the respective base configuration file.

15. The computer system of claim 14, wherein the markup language fragment includes tags which identify the tagged element within the configuration information that is to be modified in the respective base configuration file.

16. The computer system of claim 10, wherein each of the supplementary configuration files comprises markup language fragments that identify the configuration information to be modified in the base configuration file using a plurality of predetermined keywords to represent at least add, update and remove contributions to the configuration information in the respective base configuration file.

17. The computer system of claim 16, wherein an "update:" keyword is used on attributes within the configuration information, and an "add:" keyword and a "remove:" keyword are used on both elements and attributes within the configuration information.

18. The computer system of claim 1, wherein obtaining the order of applying the supplemental configuration files to the base configuration file is based on an order of selecting the templates.

19. The computer system of claim 1, wherein the base configuration and the supplementary configuration files.

20. The computer system of claim 19, wherein each template includes a respective directory storing the corresponding on or more configuration files.

21. The computer system of claim 20, wherein obtaining the order of applying the supplemental configuration files to the base configuration file is based on an order that is defined in advance.

22. A tangible, non-transient computer readable storage medium having recorded thereon instructions which, when executed by a computer system, causes the computer system to perform operations comprising:
receiving, by a deployment unit of a computing system, a user selection of a base configuration template storing a base configuration file and a plurality of supplementary configuration templates each storing a respective supplementary configuration file, each supplementary configuration file including a respective tagged element for modifying a corresponding tagged element of the base configuration file, each configuration file storing information on deploying an application program into a runtime execution environment;

obtaining an order of applying the supplemental configuration files to the base configuration file, the order indicating that a first supplemental configuration file is to be applied to the base configuration file before a second supplemental configuration file is applied to the base configuration file;

merging the base configuration file and the supplemental configuration files by a merge unit of the deployment unit in a plurality of iterations, comprising, in a first iteration, modifying configuration information provided in the base configuration file using the first supplemental configuration file and storing the modified configuration information as a new base configuration file, and then, in a second iteration, modifying configuration information stored in the new base configuration file using the second configuration file; and deploying the application program into the runtime execution environment based on modified configuration information resulted from the merging.

* * * * *